(12) United States Patent
Kushiro et al.

(10) Patent No.: US 9,176,490 B2
(45) Date of Patent: Nov. 3, 2015

(54) CONTROL PROGRAM GENERATION DEVICE, CONTROL PROGRAM GENERATION PROGRAM, AND CONTROL PROGRAM GENERATION METHOD

(75) Inventors: Noriyuki Kushiro, Tokyo (JP); Masanori Nakata, Tokyo (JP); Yoshiaki Ito, Tokyo (JP); Yoshiaki Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 380 days.

(21) Appl. No.: 13/816,950

(22) PCT Filed: Jan. 26, 2011

(86) PCT No.: PCT/JP2011/051515
§ 371 (c)(1),
(2), (4) Date: Feb. 14, 2013

(87) PCT Pub. No.: WO2012/023296
PCT Pub. Date: Feb. 23, 2012

(65) Prior Publication Data
US 2013/0144409 A1    Jun. 6, 2013

(30) Foreign Application Priority Data

Aug. 16, 2010    (JP) .................................. 2010-181897

(51) Int. Cl.
*G06F 19/00* (2011.01)
*G05B 15/02* (2006.01)
*G05B 19/042* (2006.01)

(52) U.S. Cl.
CPC ............ *G05B 15/02* (2013.01); *G05B 19/0426* (2013.01); *G05B 2219/23008* (2013.01); *G05B 2219/23261* (2013.01); *G05B 2219/2614* (2013.01)

(58) Field of Classification Search
CPC ........... G06F 8/30; G05B 19/02; G05B 15/02
USPC .................................... 717/106, 108; 700/83
See application file for complete search history.

(56) References Cited

U.S. PATENT DOCUMENTS 5,313,615 A * 5/1994 Newman et al. ............... 716/139
5,586,329 A * 12/1996 Knudsen et al. ............... 717/108
(Continued)

FOREIGN PATENT DOCUMENTS

CN         101533349 A    9/2009
JP         03-022002 A    1/1991
(Continued)

OTHER PUBLICATIONS

International Search Report of the International Searching Authority mailed Mar. 8, 2011 for the corresponding international application No. PCT/JP2011/051515 (with English translation).
(Continued)

*Primary Examiner* — Michael D Masinick
(74) *Attorney, Agent, or Firm* — Posz Law Group, PLC

(57) ABSTRACT

A control program generation device includes a control program reuse library for storing a plurality of control modules, and an architecture pattern library for storing a plurality of units of pattern information representing architecture patterns. In addition, the control program generation device correlates and displays architecture patterns selected from the architecture pattern library, program structure of control programs including the architecture patterns, execution times of the control modules, and time constraints. Moreover, in addition, the control program generation device connects control modules of the control program reuse library on the basis of the program structure.

8 Claims, 23 Drawing Sheets

(56) References Cited

U.S. PATENT DOCUMENTS

| | | | |
|---|---|---|---|
| 7,197,739 B2 * | 3/2007 | Preston et al. | 717/106 |
| 7,574,690 B2 * | 8/2009 | Shah et al. | 717/104 |
| 7,684,892 B2 * | 3/2010 | Yuan et al. | 700/181 |
| 7,809,545 B2 * | 10/2010 | Ciolfi et al. | 703/22 |
| 2004/0064804 A1 * | 4/2004 | Daniels et al. | 717/106 |
| 2008/0127057 A1 * | 5/2008 | Costa et al. | 717/106 |
| 2012/0260231 A1 * | 10/2012 | Kawaba | 717/106 |
| 2013/0232467 A1 * | 9/2013 | Katsukura et al. | 717/106 |

FOREIGN PATENT DOCUMENTS

| | | |
|---|---|---|
| JP | 04-283802 A | 10/1992 |
| JP | 07-152544 A | 6/1995 |
| JP | 08-278804 A | 10/1996 |
| JP | 10-161906 A | 6/1998 |
| JP | 2002-351509 A | 12/2002 |
| JP | 2004-272718 A | 9/2004 |
| JP | 2009-015775 A | 1/2009 |

OTHER PUBLICATIONS

Office Action dated Mar. 25, 2015 issued in corresponding CN patent application No. 201180039451.0 (and English translation).

* cited by examiner

FIG.4A
DOMAIN PATTERN TABLE

| DOMAIN ID | DOMAIN NAME | PATTERN ID |
|---|---|---|
| D0001 | BUILDING FIELD | P0001 |
| | | P0002 |
| | | ... |
| D0003 | HOME FIELD | P0001 |
| | | ... |

FIG.4B

PATTERN STRUCTURE DESCRIPTION TABLE

| PATTERN ID | PATTERN NAME | PATTERN CONTENTS | STRUCTURE DESCRIPTION ID |
|---|---|---|---|
| P0001 | OPERATION STOP | SCREEN→(STORE)→COMMUNICATE | S0001 |
| P0002 | NORMAL SCREEN | SCREEN→(STORE)→COMMUNICATE | S0001 |
| P0003 | MENU RELATED SCREEN | SCREEN→(STORE)→COMMUNICATE | S0001 |
| P0004 | TIMER·SCHEDULE | SCREEN→(STORE)→<br>(EVENT GENERATION·TIME)→COMMUNICATE | S0002 |
| P0005 | SET TEMPERATURE RANGE CONSTRAINT | SCREEN→(STORE)→(REFERENCE)→SCREEN | S0003 |
| P0006 | OPERATION LOCK | SCREEN→(STORE)→(REFERENCE)→SCREEN | S0003 |

FIG.4C
STRUCTURE DESCRIPTION TABLE

| STRUCTURE DESCRIPTION ID | STRUCTURE DESCRIPTION INFORMATION | | |
|---|---|---|---|
| | SPECIFICATION ID | CONNECTION DESTINATION ID | OTHER INFORMATION |
| S0001 | N0001 | N0002 | – |
| | N0002 | N0003 | – |
| | N0003 | N0004 | – |
| | N0004 | N0005 | – |
| | N0005 | – | – |
| ... | ... | ... | ... |

FIG.4D

SPECIFICATION TABLE

| SPECIFICATION ID | SPECIFICATION TYPE | OTHER INFORMATION |
|---|---|---|
| N0001 | Function(Start) | – |
| N0002 | Function | F0002 |
| N0003 | Function | F0003 |
| N0004 | Function | F0004 |
| N0005 | Function(End) | – |
| ... | ... | ... |

FIG.4E
CONTROL MODULE TABLE

| FUNCTION ID | FUNCTION NAME | CONTROL MODULE |
|---|---|---|
| F0001 | SCREEN | F0001.a |
| F0002 | STORE | F0002.a |
| F0003 | COMMUNICATE | F0003.a |
| ... | ... | ... |

FIG.5B

| STRUCTURE TEMPLATE | |
|---|---|
| PATTERN NAME | PATTERN CONTENTS |
| OPERATION STOP | SCREEN→(STORE)→COMMUNICATE |
| NORMAL SCREEN | SCREEN→(STORE)→COMMUNICATE |
| MENU RELATED SCREEN | SCREEN→(STORE)→COMMUNICATE |
| TIMER·SCHEDULE | SCREEN→(STORE)→<br>(EVENT GENERATION·TIME)→COMMUNICATE |
| SET TEMPERATURE RANGE CONSTRAINT | SCREEN→(STORE)→(REFERENCE)→SCREEN |
| OPERATION LOCK | SCREEN→(STORE)→(REFERENCE)→SCREEN |

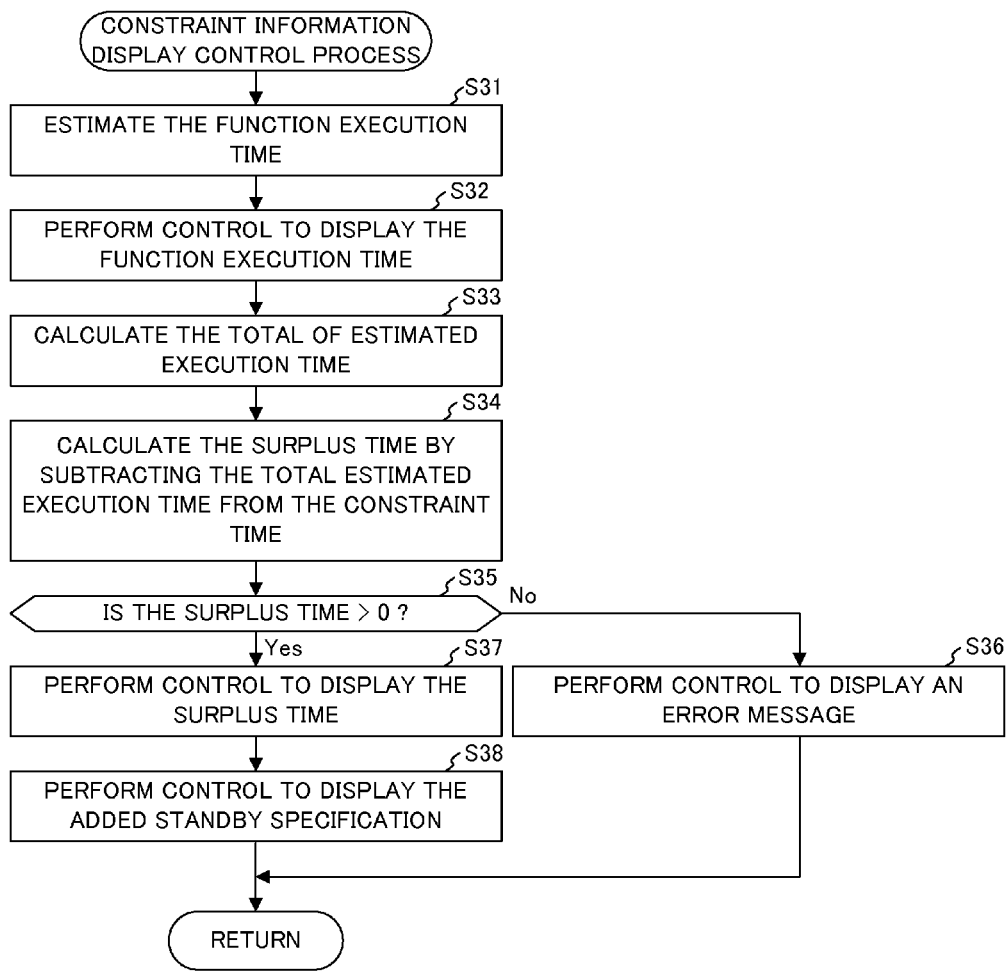

CONTROL PROGRAM GENERATION DEVICE, CONTROL PROGRAM GENERATION PROGRAM, AND CONTROL PROGRAM GENERATION METHOD

CROSS REFERENCE TO RELATED APPLICATIONS

This application is a U.S. national stage application of PCT/JP2011/051515 filed on Jan. 26, 2011, and claims priority to, and incorporates by reference, Japanese Patent Application No. 2010-181897 filed on Aug. 16, 2010.

TECHNICAL FIELD

The present invention relates to a control program generation device, control program generation program and control program generation method for controlling hardware.

BACKGROUND ART

In recent years, in order to develop products having various specifications in a short period of time, product line development is performed. In this product line development, a range of use of a product to be developed is specified as a domain, and the portions that have functions that are common among a plurality of other products that belong to the specified domain are reused (in other words, appropriated), and by only performing development for portions that have functions that are not in common with other products (in other words, differences), the development efficiency for developing a product is improved.

A method has been proposed in which in order to reuse a software program that has been developed in this way during the development of new products, a plurality of programs are selected from a plurality of memories that store programs for performing specified operations on a specified electrical device based on a series of operating procedures that are executed by that electrical device, and by linking together the selected plurality of programs, an execution program for a microprocessor that controls that electric device is automatically generated (for example, refer to Patent Literature 1).

Moreover, in order to aid in the creation of a diagram that is used in the design of a program, a system has been proposed in which contradictions that occur between different kinds of diagrams are verified based on known relationships between various diagrams that are used in designing a certain program and other kinds of programs that are used in designing other programs (for example, refer to Patent Literature 2).

Furthermore, a software execution device is proposed that, together with using a computer to virtually form hardware that is controlled by the generated control program, causes the timing of operation of the formed virtual hardware and the timing of operation of the control program that is executed by the virtual hardware to correspond with the timing of actual operation (for example, refer to Patent Literature 3).

PRIOR ART LITERATURE

Patent Literature

Patent Literature 1: Unexamined Japanese Patent Application Kokai Publication No. H04-283802
Patent Literature 2: Unexamined Japanese Patent Application Kokai Publication No. H07-152544
Patent Literature 3: Unexamined Japanese Patent Application Kokai Publication No. H10-161906

DISCLOSURE OF THE INVENTION

Problem to be Solved by the Invention

However, in the method disclosed in Patent Literature 1, programs are not generated based on a basic program design (in other words, architecture). Therefore, even when generating a program that has a common architecture pattern with a program that has already been generated, it is not possible to reuse an architecture pattern that has already been created and for which reliability has been maintained through actual use, so that it was not possible to efficiently develop a program having high reliability.

Moreover, in the system disclosed in Patent Literature 2, no method is disclosed for describing the program structure. Therefore, there was difficulty for the program designer to recognize the program structure, and difficulty for reuse of program modules and architecture.

Furthermore, in the software execution device that is disclosed in Patent Literature 3, it is not possible to display time constraints that are imposed on a control program or the execution time of control modules of a control program. Therefore, there was difficulty for the designer to know what kind of control modules to reuse when creating a control program, and difficulty generating a program that satisfied the time constraints, and difficulty reusing program modules and architecture.

In consideration of the situation described above, the objective of the present invention is to provide a control program generation device, a control program generation program and a control program generation method capable of efficiently generating a highly reliable control program for controlling hardware by reusing program modules and architecture.

Means for Solving the Problem

In order to accomplish the object of the invention described above, the control program generation of the present invention is provided with:

a control module memory that stores a plurality of control modules that control the operation of hardware;

a pattern information memory that stores a plurality of pattern information that indicates architecture patterns, which are the program structures that are common with the architecture of a control program that is composed of one or more of the plurality of control modules;

a pattern selection information acquirer that acquires pattern selection information for selecting the stored pattern information;

a constraint information acquirer that acquires constraint information that indicates a time constraint that is imposed on a control program including architecture patterns that are indicated by the pattern information selected according to the pattern selection information;

a display controller that causes the architecture indicated by the selected pattern, the program structure of the control program including the architecture pattern, the execution time of the control modules of the control program, and the time constraints indicated by the acquired constraint information to be correlated and displayed on a display;

a description information acquirer that acquires description information that describes changes to the program structure of the control program;

a program editor that edits the program structure of the control program based on the acquired description information; and a program generator that generates a control program for controlling hardware by connecting control modules that are stored in the control module memory based on the edited program structure.

Effects of the Invention

The control program generation device, control program generation program and control program generation method of the present invention is capable of efficiently generating a highly reliable control program for hardware.

BRIEF DESCRIPTION OF DRAWINGS

FIG. 4A is a diagram illustrating an example of a domain pattern table, FIG. 4B is a diagram illustrating an example of a pattern structure description table, FIG. 4C is a diagram illustrating an example of a structure description table, FIG. 4D is a diagram illustrating an example of a specifications table, and FIG. 4E is a diagram illustrating a control module table;

FIG. 5B is a diagram illustrating an example of a structure template display area;

FIG. 10 is a flowchart illustrating an example of a constraint information display control process that is executed by the control program generation device.

MODE FOR CARRYING OUT THE INVENTION

In the following, a control program generation system 1 that is composed of a control program generation device 100 of an embodiment of the present invention will be explained with reference to the accompanying drawings.

Figure 1A:
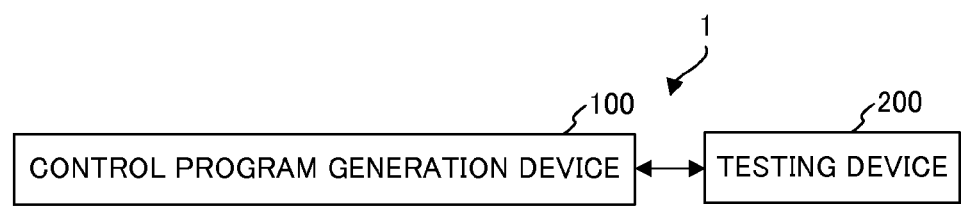
FIG. 1A is a system configuration diagram illustrating an example of a system that is composed of a control program generation device of an embodiment of the present invention.

The control program generation system 1 includes a control program generation device 100 as illustrated in FIG. 1A, and a testing device 200.

First, before explaining about the control program generation device 100, the testing device 200 will be explained.

The testing device 200 is composed, for example, of a controller for an air conditioner (hereafter called air conditioning), and is connected to the control program generation device 100 and air conditioning (not illustrated in the figure). The testing device 200 is a device that controls hardware, such as an air-conditioner, by executing a control program that is generated by the control program generation device 100, and has a function added for testing a control program. This testing device 200 receives a control program from the control program generation device 100, and executes testing of the received control program. After that, when testing is finished, the testing device 200 returns the testing analysis results information that indicate the test results to the control program generation device 100. This testing analysis results information includes information for example that correlates the module ID or module name that identifies the control module constituting the control program with execution time information that indicates the time at which the control module is executed.

The execution time of the control module includes the execution starting time and the execution ending time, and the test results include the module ID or module name that identifies the control module, and the execution period from the execution starting time to the execution ending time of the control module. Moreover, the test results can also further include the execution time and variables for the control module during that execution time.

Moreover, the device is not limited to an air-conditioning controller, and could also be a controller that controls hardware such as an elevator, lighting, parking station, and security devices and the like that are used in a building, or could be a controller that controls hardware such as a solar generator, air conditioner, floor heater, water heater, ventilation device, security device and the like that are used in a home.

Figure 1B:
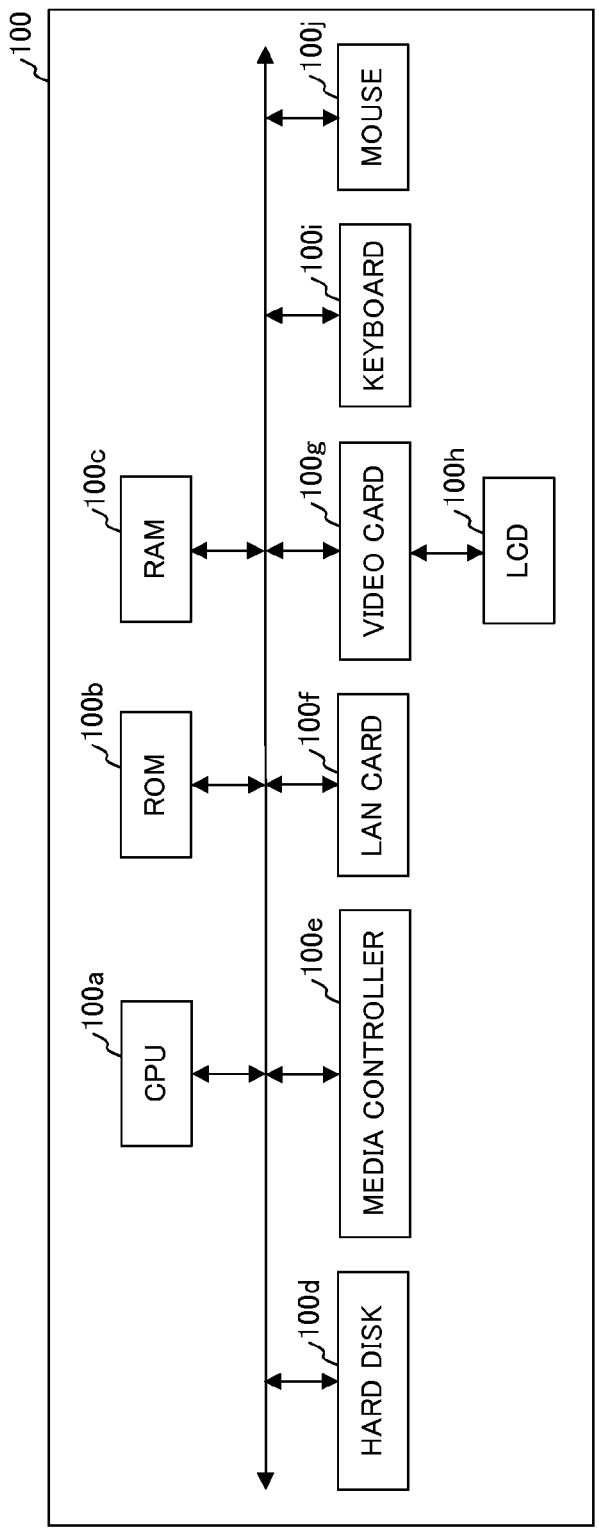
FIG. 1B is a hardware configuration diagram illustrating an example of the construction of a control program generation device.

The control program generation device 100, as illustrated in FIG. 1B, includes a CPU (Central Processing Unit) 100*a*, a ROM (Read Only Memory) 100*b*, a RAM (Random Access Memory) 100*c*, a hard disk 100*d*, a media controller 100*e*, LAN (Local Area Network) card 100*f*, a video card 100*g*, a LCD (Liquid Crystal Display) 100*h*, a keyboard 100*i*, and a pointing device (hereafter, referred to as a mouse) 100*j*.

The CPU 100*a* performs overall control of the control program generation device 100 by executing software processing (in other words, information processing) according to a program that is stored in the ROM 100*b* or on the hard disk 100*d*. The RAM 100*c* temporarily stores information (in other words, data) that is the object of processing at the time of execution of the program by the CPU 100*a*.

The hard disk 100*d* stores a table in which various information (in other words, data), such as will be described later, is saved. The control program generation device 100 may also include a flash memory instead of a hard disk 100*d*.

The media controller 100*e* reads various data and programs from storage media. Storage media includes a flash memory, CD (Compact Disc), DVD (Digital Versatile Disc), and blu-ray disc.

The LAN card 100*f* exchanges data and commands with the testing device 200 that is connected by way of a communication network 10.

The video card 100g draws (in other words, renders) an image based on a digital signal that is outputted from the CPU 100a, and outputs an image signal that represents the rendered image. The LCD 100h displays an image according to an image signal that was outputted from the video card 100g. The control program generation device 100 can also include a PDP (Plasma Display Panel) or EL (Electroluminescence) display instead of the LCD 100h.

The keyboard 100i and mouse 100j input signals according to user operation. The control program generation device 100 can also include a touch panel instead of a keyboard 100i and mouse 100j.

Next, processing that is executed by the control program generation device 100 will be explained.

Figure 2:
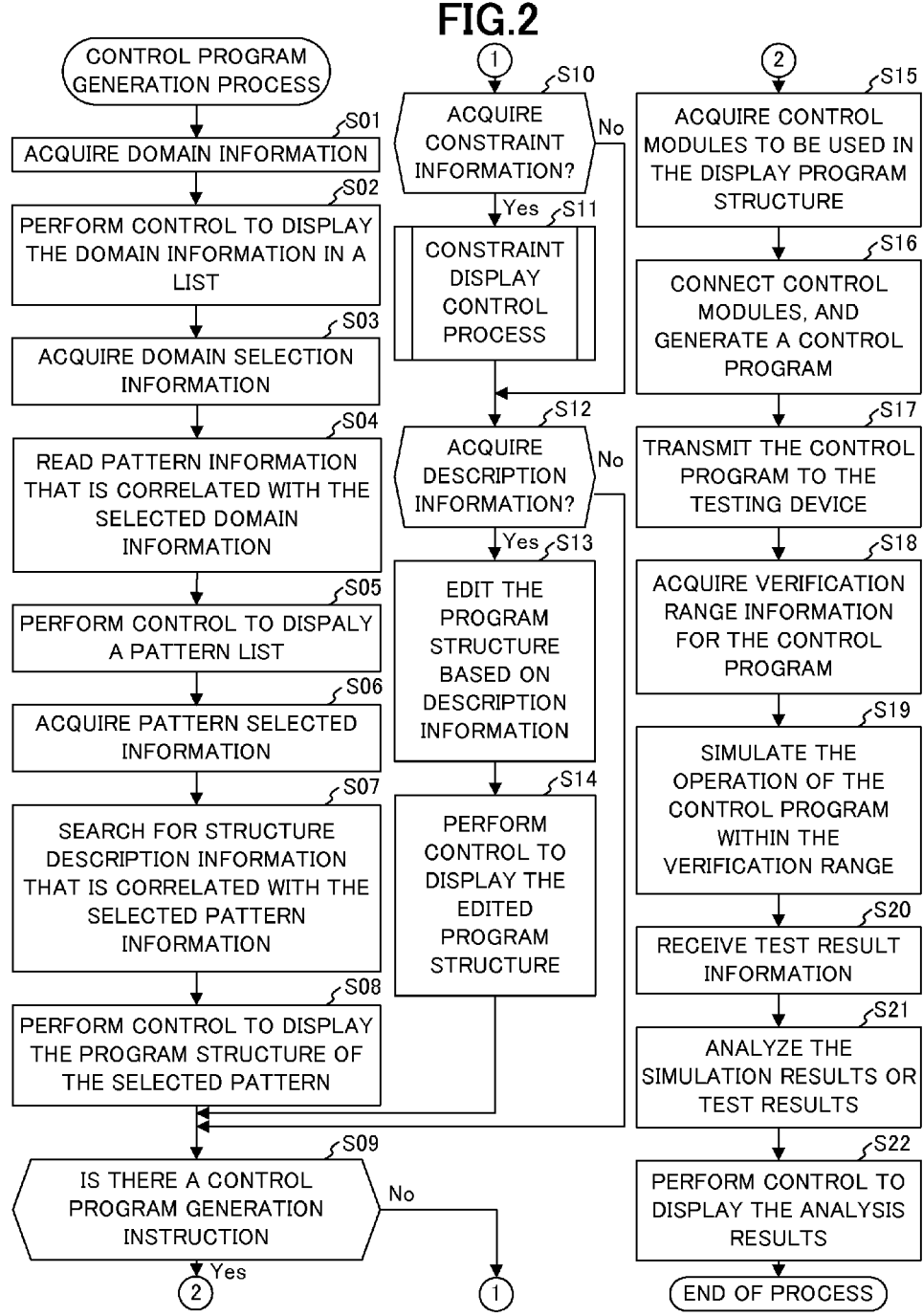
FIG. 2 is a flowchart illustrating an example of the control program generation process that the control program generation device executes.
Figure 3A:
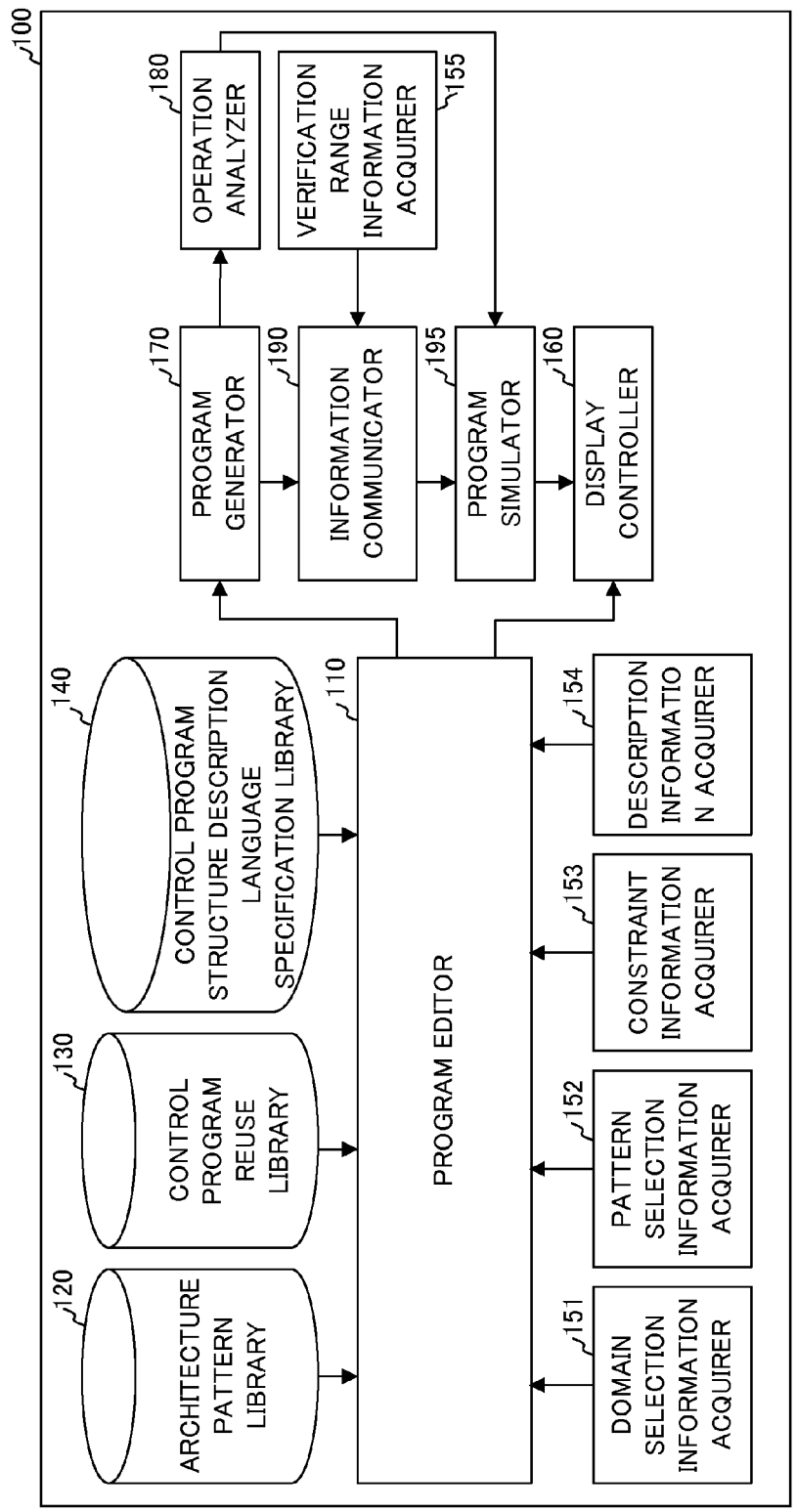
FIG. 3A is a block diagram illustrating an example of functions of the control program generation device.

The CPU 100a of the control program generation device 100, by executing the control program generation process in FIG. 2, functions as a program editor 110, an architecture pattern library (hereafter, referred to as the pattern information memory) 120, a control program reuse library (hereafter, referred to as a control module memory) 130, a control program structure description language specification library (hereafter, referred to as a description information memory) 140, domain selection information acquirer 151, pattern selection information acquirer 152, constraint information acquirer 153, description information acquirer 154, verification range information acquirer 155, display controller 160, program generator 170, information communicator 180, program simulator 190 and operation analyzer 195 as shown in FIG. 3A.

When execution of the control program generation process in FIG. 2 begins, the program editor 110 acquires domain information, which indicates the domain of the hardware that is controlled by the control program that is generated by the program generator 170, from a domain pattern table such as illustrated in FIG. 4A, which is one of a plurality of tables that are stored in the pattern information memory (in other words, the architecture pattern library) 120 in FIG. 3A (step S01).

Here, the domain is a range in which the hardware is used. For example, in the case of the hardware being an elevator, air conditioning, lighting, parking station, or security device, the hardware is used in a building. Therefore, the domain for this kind of hardware includes the building field. Also, for example, in the case where the hardware is a solar power generator, air conditioner, ventilation device, water heater or security device, this kind of hardware is used in a typical home. Therefore, the domain of this kind of hardware includes the home field. The domain pattern table in FIG. 4A stores information that indicates domain names and domain IDs that identify domains as domain information, and the fields of buildings and homes are included in the domain names.

Next, the display controller 160 in FIG. 3A controls the LCD 100h in FIG. 1A so as to display a list of domain names indicated in the domain information that was acquired by the program editor 110 (step S02).

Next, the domain selection information acquirer 151 in FIG. 3A acquires domain selection information that indicates the domain that was selected by one of the keyboard 100i and mouse 100j that is operated by the user (in other words, the control program developer) from the displayed domain names as the domain of the control program that is generated (hereafter, referred to as the selected domain) (step S03). For example, in the case of generating a control program that controls hardware that is used in a typical home, for example, the home field is selected as the domain.

Next, the program editor 110 searches for one or more items of pattern information that is correlated with the domain information that indicates the selected domain that was acquired in step S03 (hereafter, referred to as selected domain information) from the domain pattern table in FIG. 4A (step S04). Here, the pattern information includes a pattern ID that identifies a pattern, information that indicates the pattern name, and information that indicates the pattern contents.

The term pattern that is used in this specification refers to an architecture pattern, which is the program structure that is common with the architecture of the control program that is used in a certain domain (hereafter, referred to as common structure). Architecture is the basic structural design of a program.

The program editor 110, in step S04, searches for a pattern ID based on the selected domain information, and searches for information that indicates the pattern name that is correlated with the pattern ID that was found, and information that indicates the pattern contents from the pattern structure description table in FIG. 4B, which is one of the plurality of tables stored in the pattern information memory (in other words, the architecture pattern library) 120 in FIG. 3A.

Figure 5A:
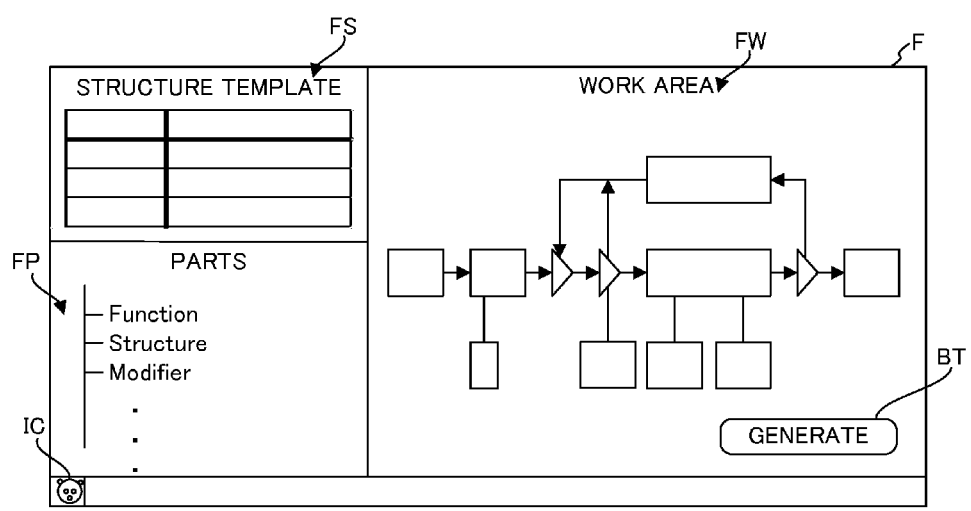
FIG. 5A is a diagram illustrating an example of an editing screen.

After step S04 in FIG. 2, the display controller 160 in FIG. 3A, based on the information found by the program editor 110, generates a list of one or more pattern names and pattern contents that are identified by the pattern ID that is correlated with the domain ID of the selected domain, and then controls the LCD 100h so as to display the generated list in the structure template display area FS of the edit screen F such as illustrated in FIG. 5A (step S05). Often a plurality of hardware that is used by a certain domain has common functions, so often the basic design of the control programs that controls that plurality of hardware is common (in other words, the programs have common architecture).

The edit screen F is a screen on which the program structure of the control program and the editing contents for the program structure are displayed. Moreover, the structure template display area FS of the edit screen F is an area where the pattern name and pattern contents of an architecture pattern, which will become an example (in other words, a template) of program structure that is common to the control programs that belong to the selected domain, are displayed as illustrated in FIG. 5B.

The icons IC on the edit screen F are correlated to commands for performing, for example, navigation displays that provide guidance for the work procedure for creating control programs using the edit screen F, help screen, or simulation results summary screen that will described later.

In explaining in detail the architecture pattern that is displayed in the structure template display area FS in FIG. 5B, the pattern contents of an architecture pattern called "Operation Stop", has a program structure in which first a process displays a specified "screen" such as control screen for hardware such as a controller, then after a touch operation of the operation stop button that is displayed on the control screen is detected, an intermediate process "stores" a value that indicates operation stop for a parameter that indicates the operation stop state, and a final process "communicates" a command for stopping operation to the hardware.

After step S05 in FIG. 2, the pattern selection information acquirer 152 acquires pattern selection information for selecting an architecture pattern from an input device operated by the user; and this architecture pattern is the pattern of the displayed pattern name, and is used as the architecture of the control pattern that will be generated (step S06).

Next, the program editor 110 searches for the structure description ID, which is correlated with the pattern ID of the selected ID that was selected using the pattern selection information that was acquired in step S06, from the pattern structure description table in FIG. 4B. The program editor 110 then searches for structure description information, which is correlated with the structure description ID that was found, from a structure description table such as illustrated in FIG. 4C, which is one of the tables that are stored in the pattern information memory (in other words, architecture pattern library) in FIG. 3A (step S07).

Here, the structure description ID is information that identifies the structure description, and structure description information is information that indicates the structure description. Moreover, the structure description in this embodiment is the description of the program structure this is indicated using program structure description language, which is a special language for describing program structure.

Here, referring to FIG. 6, an example of the program structure that is described using program structure description language will be explained.

Figure 6:
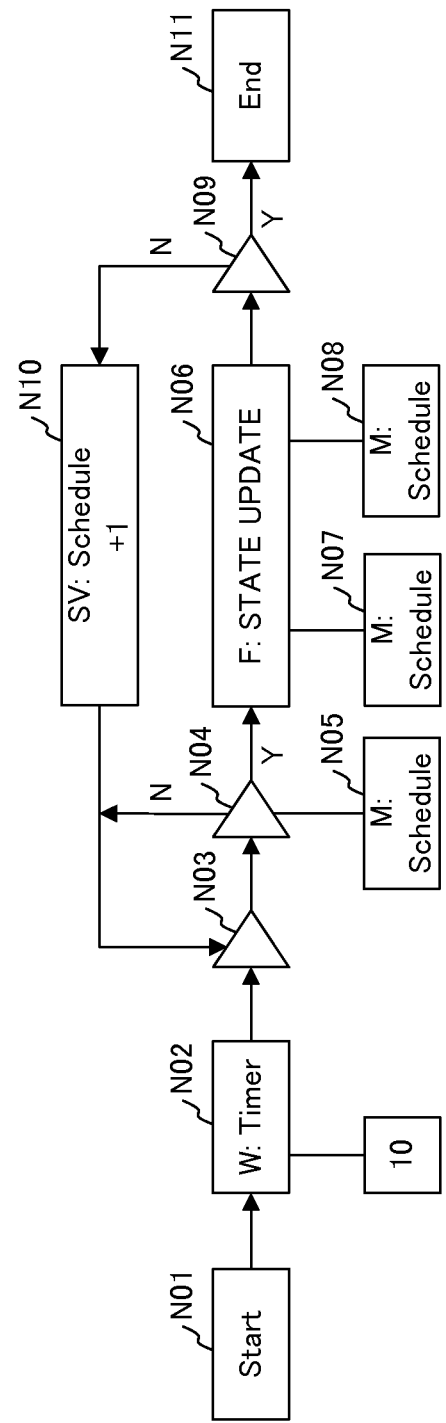
FIG. 6 is a diagram illustrating an example of program structure.

The program structure in FIG. 6 is program structure of a control program that is executed by a controller that controls air conditioning. This control program is a program that, 10 seconds after the controller has been activated, executes the air conditioning controls that are stored in a schedule list one at a time, and updates a variable that indicates the control state of the air conditioning.

The program structure in FIG. 6 is expressed by the linguistic ontology (hereafter, simply referred to as specifications) N01 to N11. Specification N01 indicates the starting point of the program function. Specification N02, which is linked by the arrow going from specification N01 to specification N02, indicates performing a waiting process (hereafter, referred to as a standby process) for the number of seconds indicated by the number that is given inside the square shape below (in other words, "10" seconds).

Specification N03 that is connected by the arrow going from specification N02 toward specification N03 indicates performing some conditional branch after processing of specification N02. Similarly, specification N04 indicates performing some conditional branch after the processing of specification N03. Specification N05 that is connected by the line segment that connects specification N04 and specification N05 indicates storing (in other words, data storage) a variable value for the variable "Schedule", which indicates the element number on the schedule list that is used in the judgment process for the conditional branch of specification N04.

The arrow with the character "N" attached on the right side and that returns from specification N04 toward specification N03 indicates that, when the judgment result at the conditional branch in specification N04 is "False", the processing of specification N03 is repeated again. On the other hand, specification N06 that is connected by the arrow with the character "Y" attached underneath and that goes from specification N04 to specification N06 indicates executing a function for updating the air conditioning control state in the case when the judgment result at the conditional branch in specification N04 is "True". Specification N07 that is connected by the line segment that connects specification N06 and specification N07 indicates storing a variable value for the variable "Schedule" that is used in specification N06. Specifications N08 and N09 are the same as specifications N07 and N04, respectively, so explanations of them are omitted.

Specification N10 with the character "N" underneath and connected by an arrow going from specification N09 towards specification N10 indicates a process of incrementing the value of the variable "Schedule" by "1" in the case when the judgment result at the conditional branch in specification N09 is "False".

The arrow going from specification N10 toward specification N03 indicates that after the processing of specification N10, the processing of specification N03 is repeated again. Moreover, specification N11 that is connected with an arrow with the character "Y" underneath and that goes from specification N09 towards specification N11 indicates that, when the judgment result at the conditional branch in specification N09 is "True", execution of the function process ends. The specifications can be recursively given. In other words, a specification indicating a function can also be expressed as a plurality of specifications indicating a plurality of functions that are included in a function.

Figure 7:
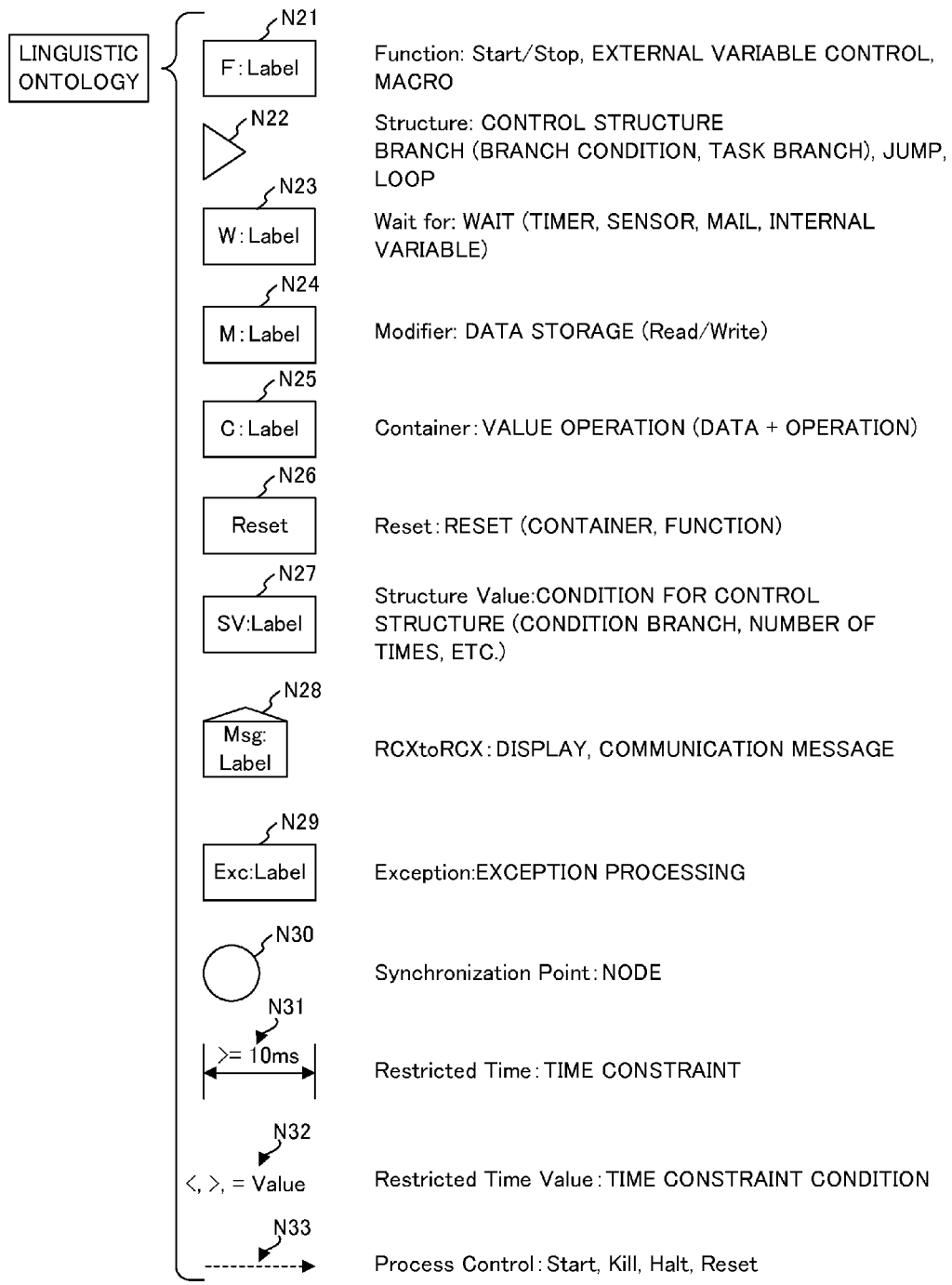
FIG. 7 is a diagram illustrating an example of linguistic ontology (specifications)

Here, linguistic ontology (in other words, specifications) that indicates the program structure is not limited to the specifications N01 to N11 illustrated in FIG. 6. For example, as illustrated in FIG. 7, specification N25 that indicates value operation processing (in other words, arithmetic processing of data), specification N26 that indicates reset processing, specification N28 that indicates message communication processing, specification N29 that indicates exception processing, specification N30 that indicates a node (in other words, a synchronization point), specification N31 that indicates a time constraint that is imposed on the execution time of a control program, or on the total execution time of a plurality of control modules of a control program, and specification N32 that indicates time constraint conditions, and specification N33 that indicates process control are included. Specification N21 to specification N24, and specification N27 were already explained in FIG. 6, so redundant explanations are omitted.

Next, specification N30 that indicates a node in FIG. 7 (hereafter, referred to as a node specification), and specification N31 that indicates a time constraint (hereafter, referred to as a constraint specification) will be explained in detail with reference to FIG. 8A.

Figure 8A:
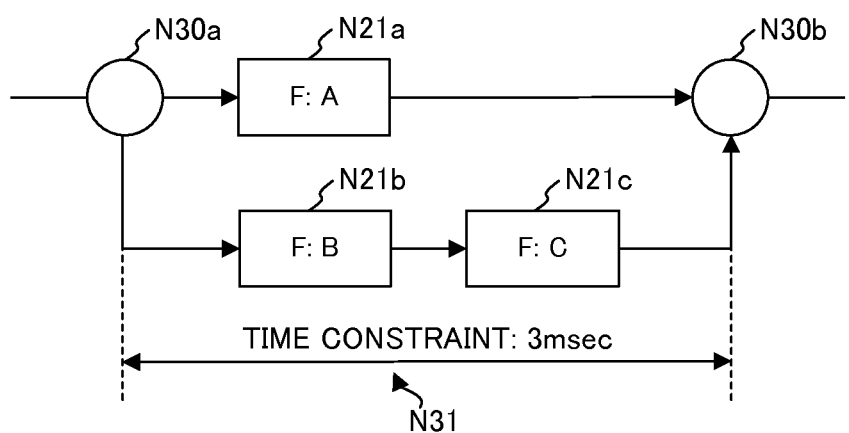
FIG. 8A is a diagram for explaining in detail node specifications and constraint specifications.

The program structure that is illustrated in FIG. 8A is expressed by specifications N21a to N21c that indicate functions (hereafter, referred to as function specifications), node specifications N30a and N30b, and constraint specification N31.

1. There are two arrows leading from the node specification N30a, so node specification N30a indicates fork processing that generates two processes. The top arrow from node specification N30a leads to function specification N21a and then leads to node specification N30b. On the other hand, the bottom arrow from node specification N30a leads in order to functions specifications N21b and N21c, and then leads to node specification N30b. Therefore, node specification N30b indicates a process that waits for (or in other words, synchronizes) the end of execution of the processing of function specification N21a, and the processing of function specification N21b and function specification N21c. Moreover, constraint specification N31 uses the dotted line that extends from the node specification N30a and the dotted line that extends from the node specification N30b to indicate a time constraint that is imposed on the control program for the completion in 3 msec of execution from the processing of node specification N30a to the processing of node specification N30b (in other words, the throughput becomes 3 msec).

With this construction, it is possible to clarify the constraint (in other words, time constraint) imposed on the execution time of the control program that is set by the hardware that is the object of control.

Figure 9A:
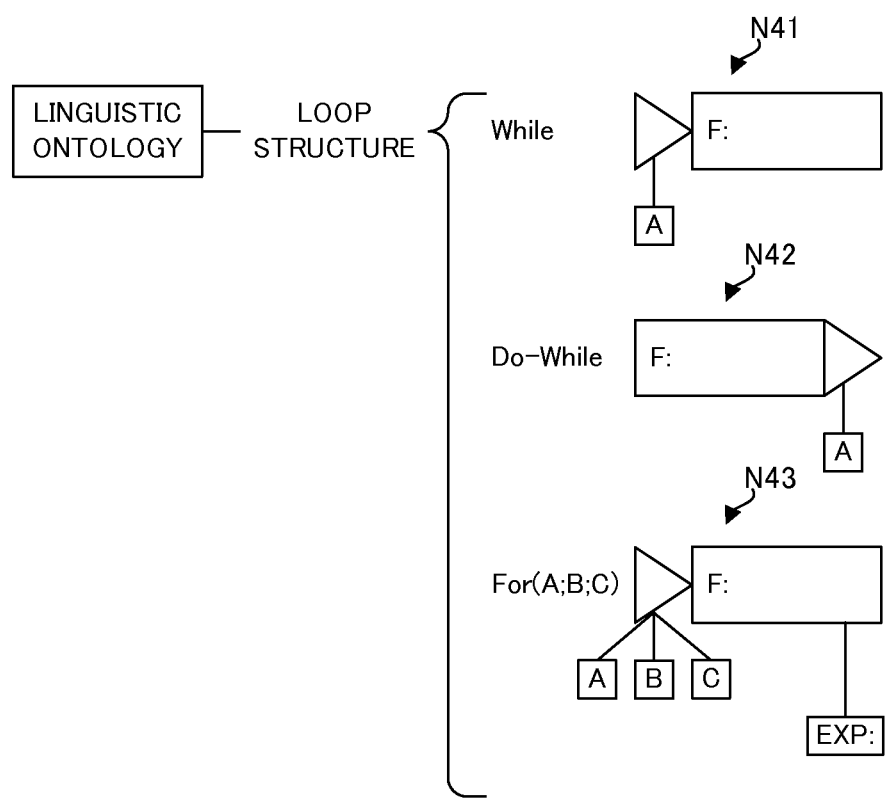
FIG. 9A is a diagram illustrating an example of linguistic ontology (specification) that illustrates the repeating structure of processing.

It is also possible for linguistic ontology (in other words, specifications) that expresses program structure to express structure for repeating a process (in other words, loop structure) as in specification N41 that indicates a "while statement" illustrated in FIG. 9A, specification N42 that indicates a "Do-while statement", and specification N43 that indicates a "For statement".

Figure 9B:
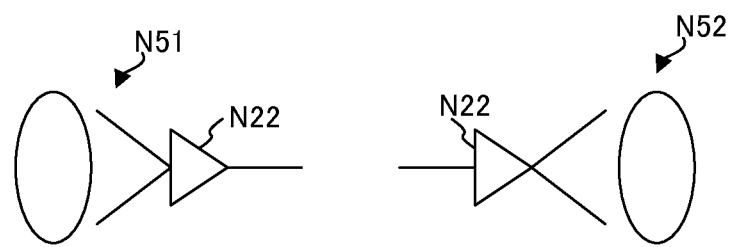
FIG. 9B is a diagram illustrating an example of linguistic ontology (specification) that illustrates a multiple input process or multiple output process.

Moreover, linguistic ontology can also include as illustrated in FIG. 9B a specification N51 that indicates a process for inputting structure (in other words, Structure Value) (in other words, multiple input process), and specification N52 that indicates a process of outputting structure (in other words, multiple output process).

Returning to FIG. 2, the control program generation process will continue to be explained from step S07.

In step S07, the structure description table in FIG. 4C that is used in the search is a table that correlates and stores structure description IDs, and structure description information that indicates structure descriptions that are identified by the structure IDs. The structure description information of the structure description table is information that correlates a specification ID that identifies a specification (in other words, linguistic ontology), a specification ID (hereafter, referred to as a connection destination ID) of a specification (or in other words, connection destination) that is connected by an arrow that extends from the specification, and other information that includes branch conditional information that, when a specification indicates a conditional branch, indicates "Y" or "N" on the side of the arrow.

This specification ID is correlated with specification information that indicates a specification, and is saved in the specification table in FIG. 4D, which is one of a plurality of tables that are stored by the description information memory (in other words, control program structure description language specification library) 140 in FIG. 3A. The specification information is other information that is necessary for indicating the type of specification that was explained with reference to FIG. 6 to FIG. 9, and the processing of each specification type. For example, when the specification indicates a function, the other information indicates the name of the function, and when the specification indicates a time constraint, the other information indicates the constraint time and a plurality of specifications for that constraint.

Returning to FIG. 2, the control program generation process will continue to be explained.

After step S07, the display controller 160 in FIG. 3A controls the LCD 100h in FIG. 1B so as to display the program structure of the selected pattern in the work area FW of the edit screen F in FIG. 5A based on the structure description information that was found by the program editor 110 (step S08).

Next, by the user operating the mouse 100j in FIG. 1B for example, a cursor that is displayed on the LCD 100h is moved over a button BT that is displayed in the work area FW in FIG. 5A, and then, based on a signal that is inputted from the mouse 100j by a clicking operation performed by the user, the program generator 170 in FIG. 3A determines whether or not an instruction was given to generate a control program (step S09).

In step S09, when the program generator 170 determines that there was no instruction to generate a control program (step S09: NO), the program editor 110 determines whether or not the constraint information acquirer 153 in FIG. 3 acquired constraint information and object information from the input device that was operated by the user (step S10). The constraint information is information that indicates a time constraint that is imposed on the execution time for a control program that is being generated, or a time constraint for the total execution time of a function that is expressed by a plurality of control modules that are executed in order of a control program that is being generated. The object information is information that indicates a control program or function for which a time constraint has been imposed.

In step S10, when the program editor 110 determines that constraint information has been acquired, a constraint information display control process is executed as illustrated in FIG. 10 (step S11).

Figure 3B:
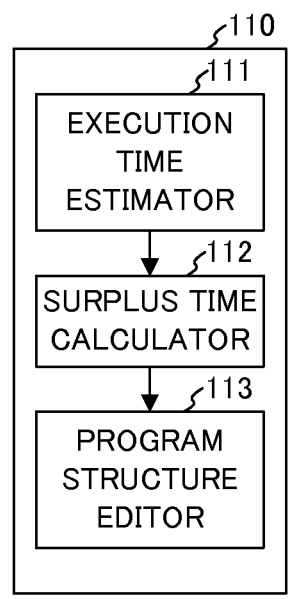
FIG. 3B is a diagram illustrating an example of the construction of a program editor.

After the constraint information display control process in FIG. 10 has begun, an execution time estimator 111 of the program editor 110 as illustrated in FIG. 3B identifies control modules that indicate function processes from a control module table as illustrated in FIG. 4E based on the function ID or function name of each function for which the time constraint indicated by the acquired constraint information is imposed. The control module table is one of a plurality of tables that are stored in the control module memory (in other words, control program reuse library) 130 in FIG. 3A.

Next, the execution time estimator 111 estimates the execution time of a function based on, for example, the number of steps within each identified control module and the performance (in other words, the CPU performance) of the device that executes the control program that is expressed by the information that was inputted from the input device (step S31). The display controller 160 then controls the LCD 100h so as to correlate the estimated execution time with the function specification that corresponds to the control module, and display the estimated execution time (step S32). After that, the execution time estimator 111 calculates the total execution time for one or more control module for which the time constraint is imposed (step S33).

Next, a surplus time calculator 112 of the program editor 110 illustrated in FIG. 3B calculates surplus time by subtracting the total estimated execution time that was calculated in step S33 from the time constraint that is indicated by the constraint information (step S34). A program structure editor 113 of the program editor 110 illustrated in FIG. 3B then determines whether or not the calculated surplus time is a positive value (step S35).

In step S35, when the program structure editor 113 determines that the surplus time is a negative value (step S35: NO), the display controller 160 in FIG. 3A controls the LCD 100h in FIG. 1B so as to display the surplus time and display an error message that the time constraint is violated (step S36). After that, execution of the constraint display control process is ended.

In step S35, when the program structure editor 113 determines that the surplus time is a positive value (step S35: YES), the display controller 160 in FIG. 3A controls the LCD 100h in FIG. 1B so as to display the surplus time (step S37). The program structure editor 113 then searches for a control module, which performs processing that does not perform control of hardware that is the object of control, nor that performs control processing that causes the hardware to wait for just the surplus time (in other words, standby processing), from the control module memory (in other words, control program reuse library) 130 in FIG. 3A. Next, the program structure editor 113 adds a specification that indicates a function that is executed using the control module that was found at the beginning, middle or end of the execution order of a plurality of specifications on which the time constraint is imposed. After that, the display controller 160 controls the LCD 100h so as to display the added specification (step S38). Execution of the constraint display control process then ends.

Figure 8B:
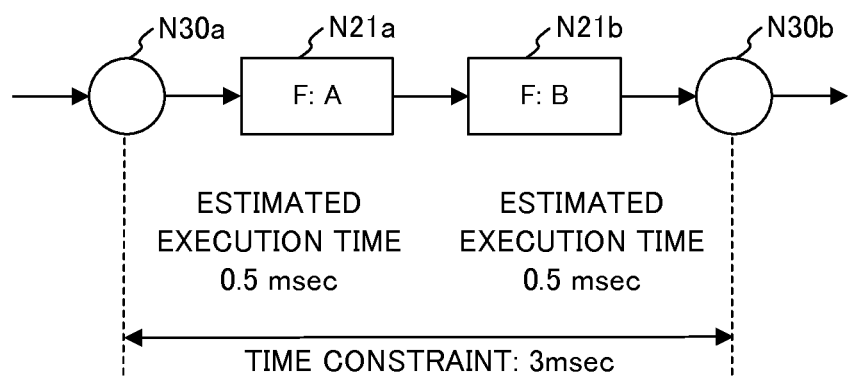
FIG. 8B is a diagram illustrating an example of a display of the execution time of a control module.

As a detailed example, an example is explained in which, as illustrated in FIG. 8B, specification N21a and specification N21b are described as being between specifications N30a and N30b, and a time constraint is imposed such that function A that is indicated by specification N21a and function B that is indicated by N21b must be executed within a total execution time of 3 msec. In this case, the execution time estimator 111 estimates that the execution time for function A and the execution time for function B are both "0.5" msec, and calculates the total estimated execution time to be "1" msec. Next, the display controller 160 controls the LCD 100h so as to display the estimated execution time "0.5" msec at a display position a specified amount below the specification N21a that indicates function A, and at a display position a specified amount below the specification N21b that indicates function B.

Next, the surplus time calculator 112 subtracts the total of the estimated execution time for function A and the estimated execution time for function B, which is "1" msec, from the time constraint of "3" msec, and calculates the surplus time to be "2" msec. The display controller 160 can also perform display control such that specification N21a and function B are correlated, and that the total execution time of "1" msec is displayed.

Figure 8C:
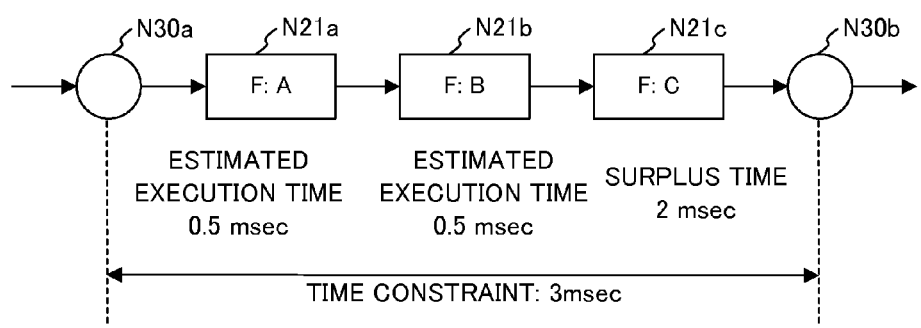
FIG. 8C is a diagram illustrating an example of a display of the surplus time.

After that, the program structure editor 113, as illustrated in FIG. 8C, adds a specification N21c that indicates a standby process to be executed for "2" msec after specification N21a and specification N21b and before specification N30b, and the display controller 160 controls the LCD 100h so as to display the surplus time of "2" msec at a display position a specified amount below the specification N21c. The specification N21c that indicates a standby process can also be added before specification N21a and specification N21b, or could be added between specification N21a and specification N21b.

After step S11 in FIG. 2, the program editor 110 determines whether or not the description information acquirer 154 in FIG. 3A acquired description information, which describes changes to the displayed program structure, from an input device that is operated by the user (step S12).

The parts display area FP of the edit screen illustrated in FIG. 5 is an area in which the linguistic ontology (in other words, specifications) stored in the description information memory (in other words, control program structure description language specifications library) 140 in FIG. 3A is displayed, and by the user operating an input device, linguistic ontology that is displayed in the parts display area FP is dragged and dropped into the work area FW where the program structure is displayed, the dropped specifications are edited, and description information that describes changes to the program structure is input to the input device.

In step S12, when the program editor 110 determines that description information has not been acquired (step S12: NO), processing returns to step S09 and the above processing is repeated. On the other hand, when the program editor 110 determines that description information has been acquired (step S12: YES), the program editor 110 edits the displayed program structure based on the acquired description information (step S13). After that, the display controller 160 controls the LCD 100h so as to display the edited program structure (step S14). Processing then returns to step S09 and the above processing is repeated.

In step S09, when the program generator 170 determines that there was an instruction to generate a control program (step S09: YES), the program generator 170 uses the specifications table in FIG. 4D that has already been explained and the control module table in FIG. 4E to acquire a control module that is to be used in the program structure that is displayed (hereafter, referred to as displayed program structure) from the control module memory (in other words, control program reuse library) 130 in FIG. 3A (step S15). Moreover, based on displayed specifications, the program generator 170 generates a control module that cannot be acquired (in other words, a new control module that cannot be reused). Next, the program generator 170 generates a control program by connecting acquired control modules based the displayed program structure (step S16).

The program generator 170, for example, correlates ID information that identifies the control program that was generated based on the displayed specifications, or information that indicates the program name with constraint information and object information that is indicated by the displayed specifications, and stores the results in the description information memory 140 in FIG. 3.

After that, the information communicator 180 in FIG. 3A transmits the generated control program to the testing device 200 (step S17). The testing device 200 installs the transmitted control program and executes a testing mode for testing the installed program. The testing device 200 executes the control program in the testing mode, and stores test results information, which indicates the execution results in which the execution state of the control program is correlated with the execution time, in a memory of the testing device 200. In this embodiment, the execution results include the execution time of the control program, ID information or name that identifies a control module of the control program, or ID information (in other words, function ID) or name (in other words, function name) that identifies the function of that control module, and an ID that identifies the process that is executed by the control module. After that, the testing device 200 transmits the test result information to the information communicator 180.

In step S17, the verification range information acquirer 155 in FIG. 3A acquires verification range information, which indicates the verification range for verifying execution of the control program, from an input device that is operated by the user (step S18).

Figure 11A:
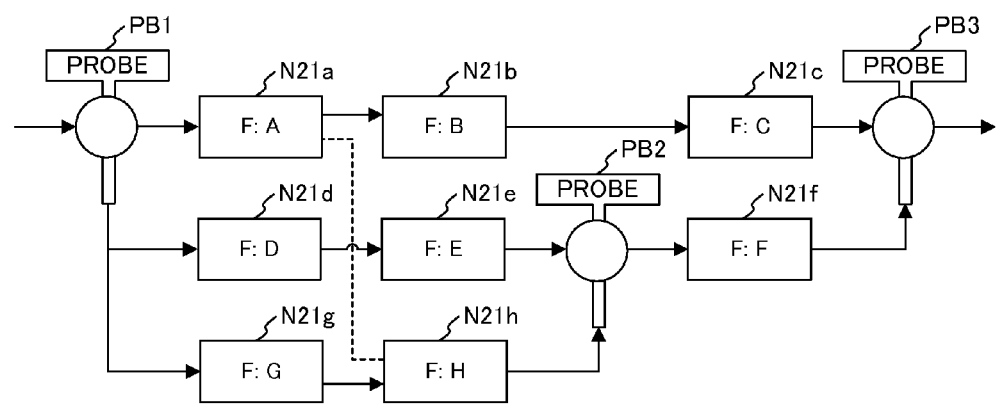
FIG. 11A is a diagram illustrating an example of a verification range.

As a detailed example, an example is explained in which the program structure of the generated control program is expressed by specifications N21a to N21h as illustrated in FIG. 11A. By operating an input device in order to specify the verification range, the user inserts probes as illustrated in FIG. 11A into positions between specifications N21a to N21h. For example, when the user inserts probe PB1 before specifications N21a, N21d and N21g, and probe PB2 after specification N21e and N21h, the verification range is from the start of the processing indicated by specification N21d to the end of processing indicated by specification N21e for one thread, and from the start of the processing indicated by specification N21g to the end of processing indicated by specification N21h for another thread.

Also, for example, when the user inserts probe PB1 before specifications N21a, N21d and N21g, and probe PB3 after specification N21c and N21f, the verification range is from the start of the processing indicated by specification N21a to the end of processing indicated by specification N21c for a first thread, from the start of the processing indicated by specification N21d to the end of processing indicated by specification N21f for a second thread, and from the start of the processing indicated by specification N21g to the end of processing indicated by specification N21h for a third thread.

After step S18 in FIG. 2, the program simulator in FIG. 3A forms virtual hardware by executing a simulation program that simulates the hardware that is the object of control. Next, by executing the generated control program in the verification range that is indicated by the verification range information, the program simulator 190 simulates the control operation for controlling the virtual hardware (step S19). When simulating the control operation of the control program, the program simulator 190 generates simulation results information that indicates the simulation results.

More specifically, of the functions that are included in the verification range that is indicated by the verification information that was acquired in step S18, the program simulator 190 identifies the function that is earliest in the execution order, and the function that is the latest in the execution order. Next, as initial values, the program simulator 190 replaces the variable values that are used for executing the control program in the verification range with values that were acquired from an input device that is operated by the user. After that, the program simulator 190 executes simulation from the processing of calling the function that is earliest in the execution order to the processing for returning from the function that is the last in the execution order.

Similar to the test results information, this simulation results information includes, for example, the execution time of the control program, ID information (in other words, module ID) or name (in other words, module name) that identifies a control module of the control program, or ID information (in other words, function ID) or name (in other words, function name) that identifies the function of that control module, and ID that identifies the process that is executed by the control module. The execution time of the control module includes the execution starting time and the execution ending time, and the simulation results include the module ID or module name of the control module, and the execution period from the execution starting time when execution of the simulation of the control module started until the execution ending time when execution of the simulation ended. Moreover, the verification results can further include the execution time and the variable value of the control module during that execution time.

After step S19, the information communicator 180 in FIG. 3A receives test results information from the testing device 200 (step S20). After that, from the simulation results indicated by the simulation results information generated in step S19, or from the test results indicated by the test results information received in step S20, and in the verification range indicated by the verification range information acquired in step S18, the operation analyzer 195 analyzes the control module and the time at which simulation or testing was executed for each function of that control module, the ID information or name that identifies the control module, ID information or names that identify the functions of the control module, and ID information that identifies the processes executed by the control module (step S21). Then, the display controller 160 controls the LCD 100*h* in FIG. 1B so as to display the analysis results of step S21 (step S22), after which execution of the control program generation process ends.

Figure 11B:
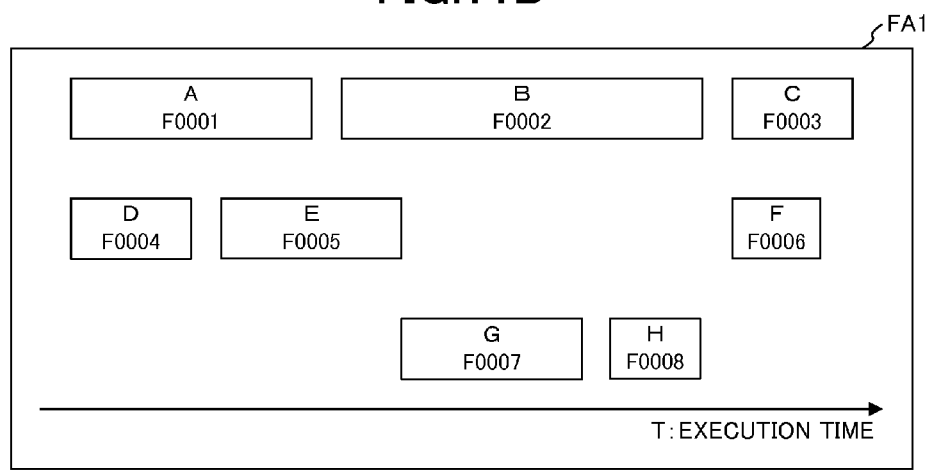
FIG. 11B is a diagram illustrating an example of an analysis result display screen.

More specifically, the LCD 100*h* displays an analysis results display screen FA1 as illustrated in FIG. 11B. The analysis results display screen FA1 in FIG. 11B has the execution time axis along the horizontal axis, and displays in order from the top of the screen the function names "A" to "C", and function IDs "F0001" to "F0003" of the control module that is executed in a first process that is generated by execution of the control program, function names "D" to "F", and function IDs "F0004" to "F0006" of the control module that is executed in a second process that is generated by execution of the control program, and function names "G" and "H", and function IDs "F0007" and "F0008" of the control module that is executed in a second process that is generated by execution of the control program. In other words, function A that is identified by the function ID "F0001" that is executed in the first process, and function B that is identified by function ID "F0002" that is executed in the second process indicate that execution was started at the same time. The function names and function IDs that are displayed on the analysis results display screen FA1 can also be module names and module IDs.

Moreover, the operation analyzer 195 analyzes the execution time of the control modules and functions of the control modules based on the time at which each function is executed. Next, the operation analyzer 195 searches from the description information memory 140 in FIG. 3 for constraint information that indicates a constraint imposed on the control program, and object information that indicates the object on which the constraint is imposed. After that, the operation analyzer 195 calculates the total execution time of the functions indicated by the found object information or the execution time of the control module, and determines whether or not the calculated execution time violates the time constraint that is indicated by the constraint information that was found (in other words, whether the analyzed test execution time or the simulation execution time is longer than the time constraint).

Figure 11C:
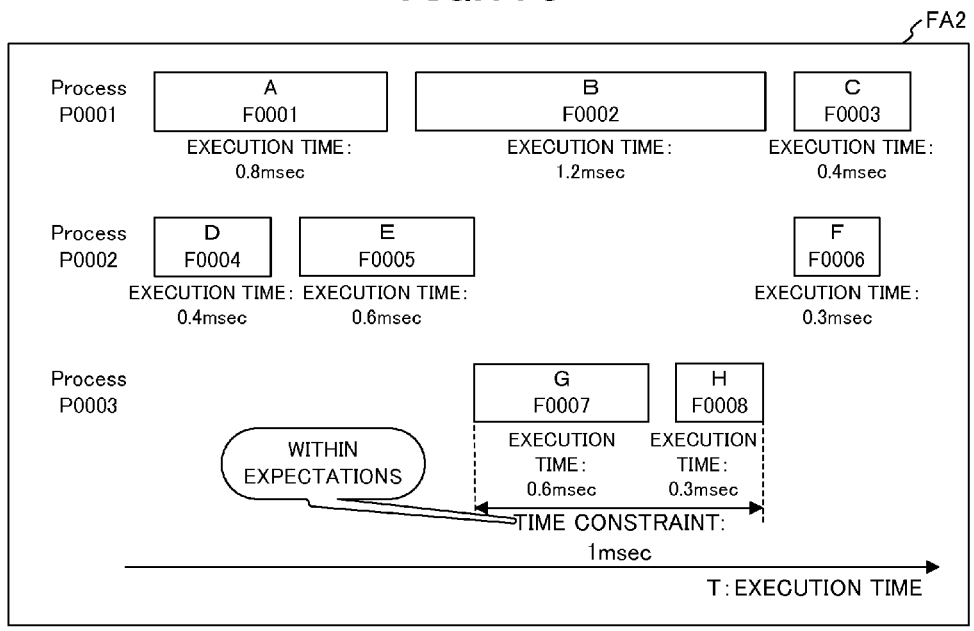
FIG. 11C is a diagram illustrating another example of an analysis result display screen.

The display controller 160 then causes the LCD 100*h* to display the analysis results display screen FA2 in FIG. 11C that expresses the judgment results by the operation analyzer 195. The analysis results display screen FA2 in FIG. 11C, similar to the analysis results display screen FA1 in FIG. 11B, has an execution time axis along the horizontal axis. Moreover, the analysis results display screen FA2 in FIG. 11C displays in order from the top of the screen the process ID "P0001" that identifies the first process, and function name "A" and function ID "F0001" of the control module that is executed in the first process, the process ID "P0002" that identifies the second process, and function name "D" and function ID "F0004" of the control module that is executed in the second process, and the process ID "P0003" that identifies the third process, and function name "G" and function ID "F0007" of the control module that is executed in the third process.

Moreover, the analysis results display screen FA2 displays the testing execution times or simulation execution times that are identified by the function IDs "F0001" to "F0008" underneath the function names. Particularly, function G that is identified by function ID "F0007", and function H that is identified by function ID "F0008" are such that the time constraint that is imposed on the total execution time of function G and function H is displayed underneath the respective test execution time or simulation execution time. Furthermore, the analysis results display screen FA2 uses balloon text from the time constraint display to display the judgment results from the operation analyzer 195 of whether or not the total testing execution time or total simulation time for function G and function H violates the time constraint.

With this construction, by executing a plurality of tasks (in other words, multiple processes) in parallel, it becomes possible for the user to easily know whether there will be mutual interference between tasks such as deadlock that occurs when a plurality of tasks control the same hardware.

With this construction it is possible to display time constraints that are imposed on the control program being generated, and the execution time of the control modules of the control program regardless of the architecture of the control program being generated. Therefore, it is easy for the designer of the control program to know not only the program structure of the control program that controls hardware, but also time constraints that are imposed on each control module of the control program. Consequently, it is possible to efficiently generate a new control program having high reliability by reusing control modules and architecture that have already been created and saved.

Moreover with this construction, the time constraints on the execution time that are imposed on the control program and the surplus time with respect to the time constraints are displayed, so that the user is easily able to know whether or not the control program being generated satisfies the time constraints, and thus it is possible to efficiently generate a control program. Furthermore with this construction, the time required for testing execution or simulation execution of the control program, and time constraints that are imposed on the control program are displayed, so the user is able to easily know whether or not the time constraints of the generated control program are satisfied, and thus it is possible to efficiently test the generated control program. Also with this construction, whether or not the time required for testing execution or simulation execution of the control program violates the time constraints that are imposed on the control program is displayed, so that the user is able to easily know whether or not the generated control program violates the time constraints, and thus it is possible to more efficiently test the control program.

Furthermore with this construction, the program structure of the control program is edited so that a standby module, whose execution length is equal to the length of the surplus time, is executed at either the start, middle or end of the execution order of a plurality of control modules on which a time constraint has been imposed, so that it is possible to easily generate a control program having high reliability that satisfies the time constraint.

Also with this construction, together with simulation of the execution of a control program in the verification range, ID information for a control module and the time at which simulation of the control module is executed are displayed based on the simulation results, so it is possible to easily check the execution results of a control module in a short calculation time.

Moreover with this construction, a control program, which is a control program that controls a program that is used in a selected domain, and that has one or more architecture patterns that are in common with a control program that is already used in the selected domain, is generated by connecting one or more control modules that have already been used in the selected domain. By generating a control program by reusing architecture and control modules that have already been used in the selected domain in this way, it is possible to efficiently generate a control program, which has high reliability and that controls hardware that is used in the selected domain, in a short time and with few steps.

Furthermore with this construction, a control program is generated based on reused architecture patterns, so that not only is it possible to reuse a computer program such as a control module, it is also possible to reuse basic design knowhow of program structure called an architecture pattern.

Of course it is possible to provide a device as a control program generation device 100 that already has the construction for achieving the function of this embodiment, however, by applying a program, it is also possible to have an existing control program generation device function as the control program generation device 100 of this embodiment. In other words, by applying a control program for achieving all of the functions of the control program generation device 100 described in the embodiment above such that a computer (CPU and the like) that controls an existing control program generation device can execute that program, it is possible to cause that existing device to function as the control program generation device 100 of this embodiment. The control program generation method of this embodiment can also be performed using the control program generation device 100.

Moreover, when the functions described above are achieved by the OS (Operating System) taking charge, or when the functions are achieved by the OS and applications working together, it is possible to store only the portions other than the OS on a medium and distribute those portions, or it is possible to download those portions.

The method for distributing this kind of program is arbitrary, and for example, can be stored and distributed on a recording medium such as CD-ROM or DVD-ROM, or can be distributed by way of a communication medium such as the Internet.

Furthermore, various embodiments and variations of the present invention are possible without departing from the broad spirit and range of the invention. Moreover, the embodiments described above are for explaining the present invention and do not limit the range of the claims. In other words, the range of the present invention is as presented in the claims and not the embodiments. Variations that are within the range of the claims, or that are within a range that is equivalent in significance to that of the present invention are considered to be within the range of the present invention.

A preferred embodiment of the present invention was described in detail above, however, the present invention is not limited to the embodiment above, and various variations or modifications are possible within the range of the invention as disclosed in the claims.

This application is based on Unexamined Japanese Patent Application Kokai Publication No. 2010-181897 filed on Aug. 16, 2010. The entire disclosure of Unexamined Japanese Patent Application Kokai Publication No. 2010-18197 is incorporated in this specification by reference.

INDUSTRIAL APPLICABILITY

The present invention is applied to a control program generation device that generates a control program for controlling hardware such as equipment that is used in the building field or home field.

DESCRIPTION OF REFERENCE NUMERALS

1 Control program generation system
100 Control program generation device
100*a* CPU
100*b* ROM
100*c* RAM
100*d* Hard disk
100*e* Media controller
100*f* LAN card
100*g* Video card
100*h* LCD
100*i* Keyboard
100*j* Mouse
110 Program editor
111 Execution time estimator
112 Surplus time calculator
113 Program structure editor
120 Architecture pattern library
130 Control program reuse library
140 Control program structure description language specification library 151 Domain selection information acquirer
152 Pattern selection information acquirer
153 Constraint information acquirer
154 Description information acquirer
155 Verification range information acquirer
160 Display controller
170 Program generator
180 Information communicator
190 Program simulator
195 Operation analyzer
200 Testing device

The invention claimed is:

1. A control program generation device, comprising:
a control module memory that stores a plurality of control modules that control an operation of hardware;
a pattern information memory that stores a plurality of pattern information that indicates an architecture pattern, which is a program structure that is common with architectures of control programs that are composed of one or more of the plurality of control modules;
a pattern selection information acquirer that acquires pattern selection information for selecting the stored pattern information;
a constraint information acquirer that acquires constraint information that indicates a time constraint that is imposed on an execution time of a control program including the architecture pattern that is indicated by the pattern information selected according to the pattern selection information, the constraint information further indicating a constraint on a total execution time of a plurality of control modules of the control program;
an execution time estimator that estimates an execution time for each of the plurality of control modules on which the constraint, which is indicated by the constraint information for the total execution time, is imposed;
a surplus time calculator that calculates a surplus time with respect to the constraint based on the constraint on the total execution time that is indicated by the constraint information, and the execution time that is estimated by the execution time estimator;
a display controller that causes the architecture pattern indicated by the selected pattern information, the program structure of the control program including the architecture pattern, the estimated execution times of the control modules of the control program, the time constraint indicated by the acquired constraint information, and the surplus time that is calculated by the surplus time calculator to be correlated and displayed on a display;
a description information acquirer that acquires description information that describes changes to the program structure of the control program;
a program structure editor that edits the program structure of the control program based on the acquired description information; and
a program generator that generates a control program for controlling hardware by connecting control modules that are stored in the control module memory based on the edited program structure.

2. The control program generation device according to claim 1, wherein
the control module includes a standby module that does not perform control of the hardware, nor performs control that causes the hardware to wait; and
the program structure editor edits the program structure of the control program so that a standby module, whose length of an execution time is equal to a length of the surplus time, is executed at either the beginning, middle or end of an execution order of the plurality of control modules, when the surplus time that is calculated by the surplus time calculator is a positive value.

3. The control program generation device according to claim 2, further comprising:
a verification range information acquirer that acquires verification range information that indicates a verification range for verifying execution of the generated control program;
a program execution simulator that simulates execution of the generated control program in the verification range that is identified by the acquired verification range information; and
an analyzer that analyzes, from the simulation results of the program execution simulator, ID information, which identifies the control modules of the generated control program, and time at which simulation was executed for the control modules; wherein
the display controller performs control of the display so as to display an analysis results from the analyzer.

4. The control program generation device according to the claim 1, wherein
the pattern information memory stores a plurality of domain information and pattern information, the domain information indicating a domain, which is a range in which the hardware is used, the pattern information indicating an architecture pattern that is common with the architectures of a plurality of control programs that control a plurality of the hardware that is used in the range, and the domain information and the pattern information being correlated with each other; and further comprises:
a domain selection information acquirer that acquires domain selection information for selecting the stored domain information; wherein
the pattern selection information acquirer acquires pattern selection information for selecting stored pattern information that is correlated with the domain information that is selected according to the acquired domain selection information.

5. The control program generation device according to the claim 2, wherein
the pattern information memory stores a plurality of domain information and pattern information, the domain information indicating a domain, which is a range in which the hardware is used, the pattern information indicating an architecture pattern that is common with architectures of a plurality of control programs that control a plurality of the hardware that is used in the range, and the domain information and the pattern information being correlated with each other;
the control program generation device further comprises a domain selection information acquirer that acquires domain selection information for selecting the stored domain information; and
the pattern selection information acquirer acquires pattern selection information for selecting stored pattern information that is correlated with the domain information that is selected according to the acquired domain selection information.

6. The control program generation device according to the claim 3, wherein
the pattern information memory stores a plurality of domain information and pattern information, the domain information indicating a domain, which is a range in which the hardware is used, the pattern information indicating an architecture pattern that is common with architectures of a plurality of control programs that control a plurality of the hardware that is used in the range, and the domain information and the pattern information being correlated with each other;

the control program generation device further comprises a domain selection information acquirer that acquires domain selection information for selecting the stored domain information; and the pattern selection information acquirer acquires pattern selection information for selecting stored pattern information that is correlated with the domain information that is selected according to the acquired domain selection information.

7. A computer-readable recording medium on which a control program generation program is recorded, the control program generation program that causes a computer to function as:

a control module memory that stores a plurality of control modules that control an operation of hardware;

a pattern information memory that stores a plurality of pattern information that indicates an architecture pattern, which is a program structure that is common with architectures of control programs that are composed of one or more of the plurality of control modules;

a pattern selection information acquirer that acquires pattern selection information for selecting the stored pattern information;

a constraint information acquirer that acquires constraint information that indicates a time constraint that is imposed on an execution time of a control program including the architecture pattern that is indicated by the pattern information selected according to the pattern selection information, the constraint information further indicating a constraint on a total execution time of a plurality of control modules of the control program;

an execution time estimator that estimates an execution time for each of the plurality of control modules on which the constraint, which is indicated by the constraint information for the total execution time, is imposed;

a surplus time calculator that calculates a surplus time with respect to the constraint based on the constraint on the total execution time that is indicated by the constraint information, and the execution time that is estimated by the execution time estimator;

a display controller that causes the architecture pattern indicated by the selected pattern information, the program structure of the control program including the architecture pattern, the estimated execution times of the control modules of the control program, the time constraint indicated by the acquired constraint information, and the surplus time calculated by the surplus time calculator to be correlated and displayed on a display;

a description information acquirer that acquires description information that describes changes to the program structure of the control program;

a program structure editor that edits the program structure of the control program based on the acquired description information; and a program generator that generates a control program for controlling hardware by connecting control modules that are stored in the control module memory based on the edited program structure.

8. A control program generation method, comprising:

a pattern selection information acquisition step of acquiring pattern selection information for selecting pattern information that indicates an architecture pattern, which is a program structure that is common with architectures of a plurality of control programs that are composed of one or more control module for controlling an operation of hardware, from a plurality of pattern information that is stored in a pattern information memory;

a constraint information acquisition step of acquiring constraint information that indicates a time constraint that is imposed on an execution time of a control program including the architecture pattern that is indicated by the pattern information selected according to the pattern selection information, the constraint information further indicating a constraint on a total execution time of a plurality of control modules of the control program;

an execution time estimation step of estimating an execution time for each of the plurality of control modules on which the constraint, which is indicated by the constraint information for the total execution time, is imposed;

a surplus time calculation step of calculating a surplus time with respect to the constraint based on the constraint on the total execution time that is indicated by the constraint information, and the execution time that is estimated by the execution time estimator;

a display control step of causing the architecture pattern indicated by the selected pattern information, the program structure of the control program including the architecture pattern, the estimated execution times of the control modules of the control program, the time constraint indicated by the acquired constraint information, and the surplus time that is calculated by the surplus time calculator to be correlated and displayed on a display;

a description information acquisition step of acquiring description information that describes changes to the program structure of the control program;

a program structure editing step of editing the program structure of the control program based on the acquired description information; and a program generation step of generating a control program for controlling hardware by connecting control modules based on the edited program structure.

* * * * *